Oct. 9, 1962 G. COATES ET AL 3,057,793
IMPROVEMENTS RELATING TO LOCKING ARRANGEMENTS
FOR NUCLEAR REACTOR FUEL ELEMENTS
Filed Sept. 12, 1960 4 Sheets-Sheet 3

INVENTORS
Graham Coates
Terence Graham Bryant
BY
Larson and Taylor 3,057,793
IMPROVEMENTS RELATING TO LOCKING ARRANGEMENTS FOR NUCLEAR REACTOR FUEL ELEMENTS
Graham Coates, Knutsford, England, and Terence Graham Bryant, Rumney, Cardiff, South Wales, assignors to A.E.I.-John Thompson Nuclear Energy Company Limited, London, England, a British company
Filed Sept. 12, 1960, Ser. No. 55,587
Claims priority, application Great Britain Sept. 15, 1959
5 Claims. (Cl. 204—193.2)

This invention relates to nuclear reactors of the kind employing a liquid coolant such as boiling water reactors and more particularly to reactors intended for mobile equipment such as ship propulsion.

In boiling water reactors the fuel elements usually each comprise a cluster of fuel rods extending vertically and parallel to each other and supported in a casing. In usual constructions there are two horizontal grids extending across the reactor vessel and the fuel element units usually rest on the lower grid whilst the upper grid acts to prevent sideway movement and hold the fuel elements in an upright position.

Whilst such an arrangement may be perfectly suitable for static power units there is a risk when they are employed for ship propulsion of the fuel elements being shaken out of their supports and causing fracture and interference with circulation of the coolant. At the same time it will be appreciated that any locking arrangement for holding the fuel elements in the grids must be capable of detachment so that the fuel elements can be replaced and furthermore, it must be capable of external operation.

The main object of the invention is to provide an improved locking arrangement for fuel elements which satisfies these requirements.

According to the present invention there is provided a locking arrangement for fuel elements in the form of horizontally extending rods which engage recesses in the sides of the fuel element casings, which locking rods are themselves recessed at one or more intervals and are movable longitudinally between a lock position in which the locking rod engages the recess in the side of the fuel element casing and a release position in which a recess in the locking rod is aligned with the recess in the fuel unit casing so as not to obstruct movement of the fuel unit when it is lifted out of the support grid in the reactor.

Preferably, the fuel units are arranged in rows and the locking rods extend along a complete row and have release recesses for each of the fuel elements so that by a longitudinaly movement of the locking rod all the fuel units in that row can be released for removal.

According to a preferred construction the lower end of the fuel element has a circular periphery and an annular recess extends around the circular portion of the periphery which recess is engaged by the locking rod.

In order that the invention may be more clearly understood reference will now be made to the accompanying drawings, in which.

Figure 1:
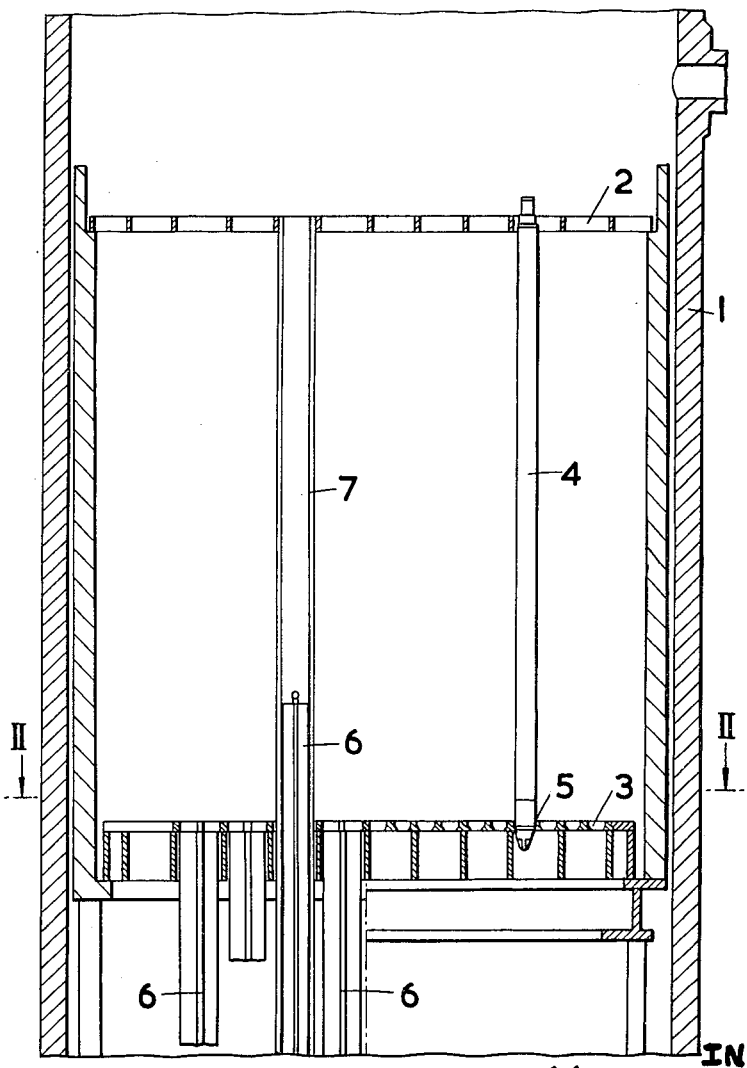
FIG. 1 is a vertical sectional view of part of a boiling water reactor showing the general arrangement of the fuel units.

Referring first to FIG. 1 the reference 1 indicates the wall of the reactor vessel whilst 2 is an upper dia-grid and 3 the lower dia-grid. The reference 4 indicates one of the fuel units the lower end of which rests in a recess 5 in the lower dia-grid 3 and is supported thereby, whilst the upper end of the fuel unit 4 extends through the dia-grid 2 and is located laterally by it. The reference 6 indicates a control rod extending through a control rod passage 7 partially. It will be appreciated that for simplicity only one of the fuel units 4 is shown in FIG. 1 and similarly, only one of the control rod casings 7 is shown, it being appreciated that there is a matrix array of both of these components.

Figure 2:
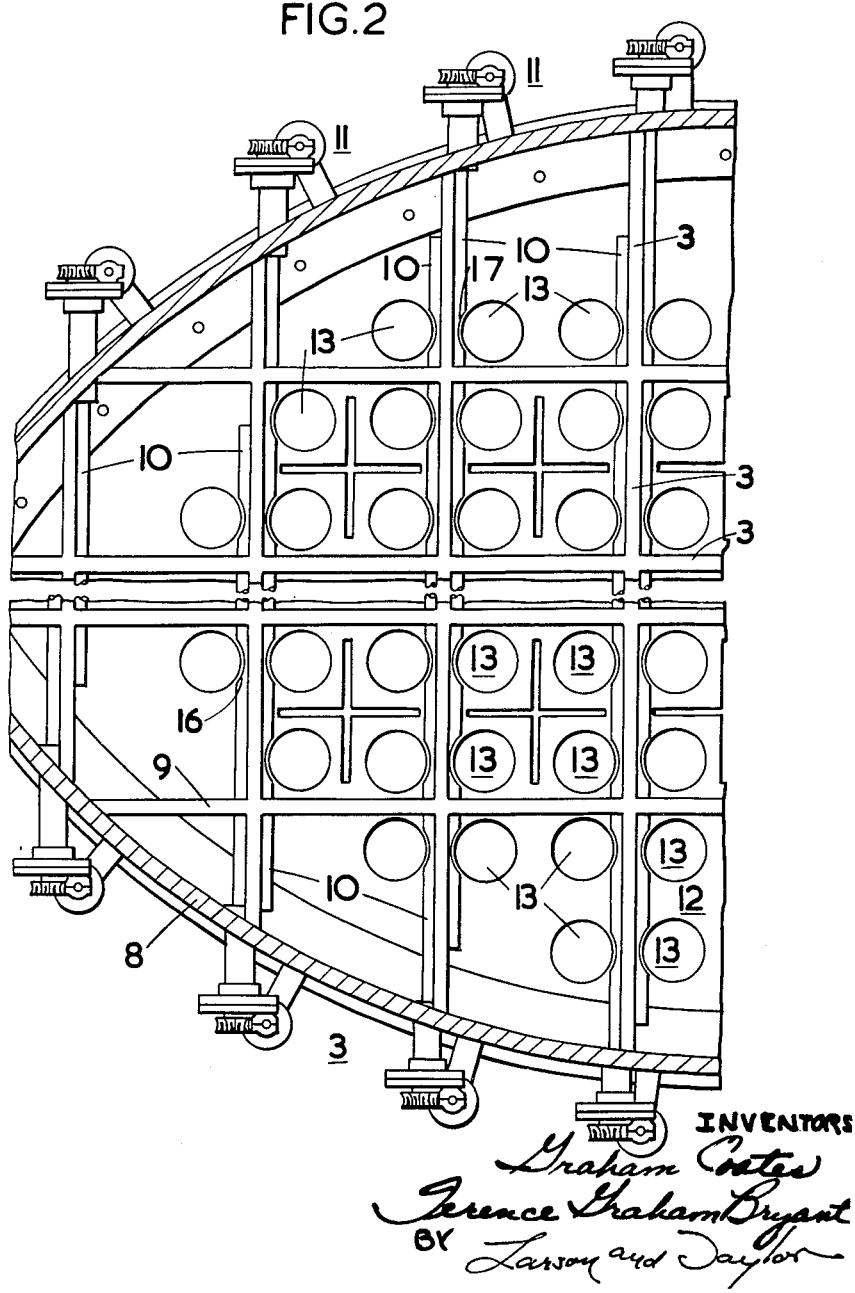
FIG. 2 is an inverted plan view shown to an enlarged scale of the lower dia-grid shown in FIG. 1.

In FIG. 2 it will be seen that the lower dia-grid 3 consists of a surrounding annular member 8 and vertical webs 9 extending at right angles to each other to form a number of square passage-ways each of which contains one of the control rods 6 and four of the fuel element units 4. 10 are the locking rods. It will be observed that these are arranged in pairs, one rod of each pair extending on each side of the webs 9 which in FIG. 2 are aligned vertically and the other rod extending upwardly on the other side of the same line of webs. The locking rods are moved longitudinally by a mechanism 11 which will be described in greater detail subsequently.

Figure 3:
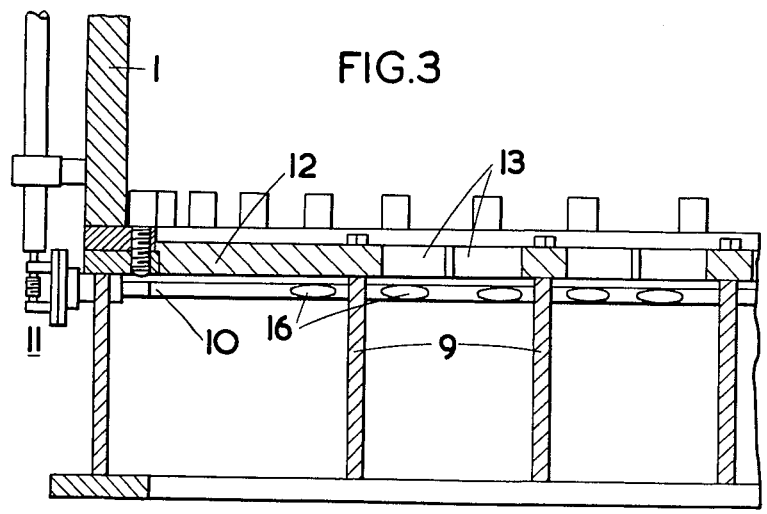
FIG. 3 is a vertical section taken on the centre line of FIG. 2.
Figure 4:
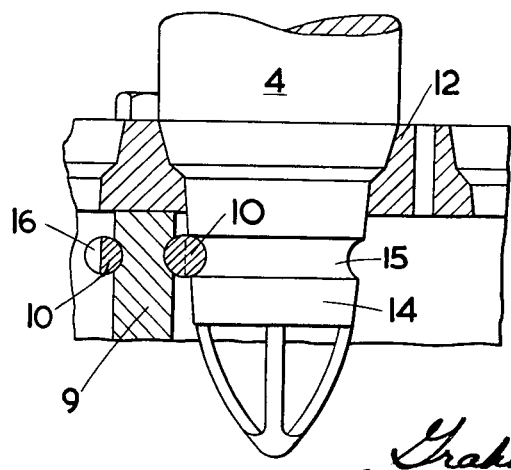
FIG. 4 is a detail view showing a part vertical section of a lower end of a fuel element.

Referring to FIGS. 3 and 4 it will be seen that the lower dia-grid is formed of a horizontal plate 12 supported upon the arrangement of cross webs 9. The plate 12 is formed with apertures 13 which support the lower ends of the fuel elements. FIG. 4 shows a fuel element 4 having a nose 14 at the lower end around which is an annular groove 15 which is shown engaged by a locking rod 10. In the particular arrangement shown in FIG. 4 the locking rod engages the groove 15 and prevents withdrawal of the fuel element. The rods 10, however, are formed with side recesses 16 (see FIGS. 2 and 3) which in the position shown in FIG. 2, are aligned with the grooves 15; in this position the fuel element can be lifted out of the support grid.

Figure 5:
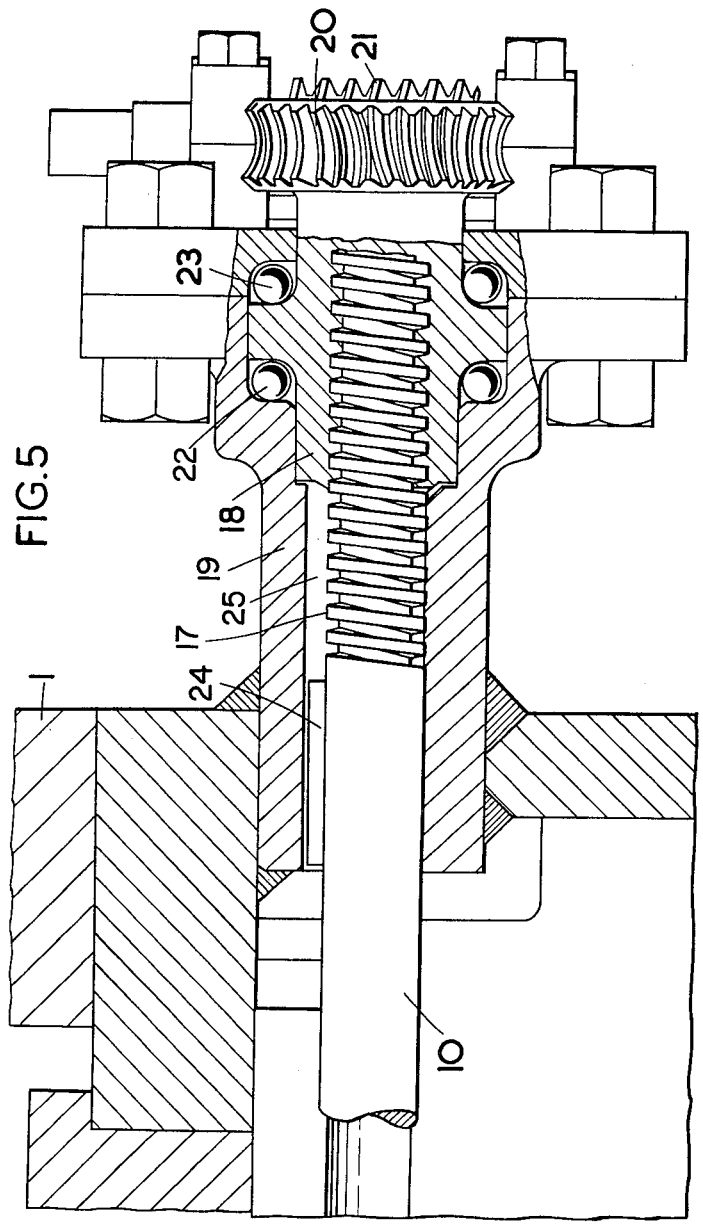
FIG. 5 is a detail view of the apparatus for actuating the locking rods.

In FIG. 5 the locking rod 10 is shown extending through the wall 1 of the reactor vessel. At its outer end the rod 10 is formed with a square thread 17 engaging a collar 18 carried in a housing 19. The collar 18 is rotatable by a worm wheel 20 to which it is attached and which is engaged by a worm 21 shown in FIG. 5 behind the worm wheel 21. By rotating the worm 21 the worm wheel 20 is rotated and this in turn rotates the collar 18. Axial movement of the collar 18 is obstructed by ball races 22 and 23 and hence the rotation causes the rod 10 to move longitudinally either into or out of the lock position, as the case may be. Rotation of the rod 10 in this mechanism is obstructed by a key 24 which may be rigid with a locking rod 10 and engage a slot 25 in the housing 19 or abut against bosses on the internal surface of the housing 19.

What we claim is:

1. In a nuclear reactor having a liquid coolant, a plurality of fuel elements each comprising fissile material in casing, surfaces defining horizontally extending grooves in the external surfaces of said fuel element casings, supports for locating said fuel elements vertically in the coolant and means for locking said fuel elements in the supports, said locking means comprising horizontally extending locking rods engaging the grooves in said fuel element casings, surfaces defining recesses in said locking rods and means for moving said rods longitudinally so that the recesses in the locking rods are aligned vertically with the fuel elements to permit withdrawal of the fuel elements from the supports.

2. In a nuclear reactor having a liquid coolant, a plurality of fuel elements arranged in rows, each element comprising fissile material in casing, surfaces defining horizontally extending grooves in the external surfaces of said fuel element casings, supports for locating said fuel elements vertically in the coolant and means for locking said fuel elements in the supports, said locking means comprising horizontally extending locking rods extending along the rows of fuel elements and engaging the grooves in each of said fuel element casings, surfaces defining recesses in said locking rods and means for moving said rods longitudinally so that the recesses in the locking rods are aligned vertically with all the fuel elements respectively to permit withdrawal of the fuel elements from the supports.

3. In a nuclear reactor having a liquid coolant, a plurality of fuel elements arranged in rows, each element comprising fissile material in casing, surfaces defining grooves extending horizontally around the external surfaces of the lower ends of said fuel element casings, supports for locating said fuel elements vertically in the coolant and means for locking said fuel elements in the supports, said locking means comprising horizontally extending locking rods extending along the rows of fuel elements and engaging the grooves in each of said fuel element casings in the respective row, surfaces defining recesses in said locking rods and means for moving said rods longitudinally so that the recesses in the locking rods are aligned vertically with all the fuel elements respectively in a row to permit withdrawal of the fuel elements from the supports.

4. In a nuclear reactor having a liquid coolant, a plurality of fuel elements arranged in rows, each element comprising fissile material in casing, surfaces defining horizontally extending grooves in the external surfaces of said fuel element casings, supports for locating said fuel elements vertically in the coolant and means for locking said fuel elements in the supports, said locking means comprising horizontally extending locking rods extending along the rows of fuel elements and engaging the grooves in each of said fuel element casings in a row, surfaces defining recesses in said locking rods and means for shifting said rods longitudinally so that the recesses in the locking rods are aligned vertically with the fuel elements to permit withdrawal of the fuel elements from the supports, said rod shifting means comprising threaded portions at the ends of said rods engaged by nuts and means for rotating said nuts to shift said rods.

5. In a nuclear reactor having a liquid coolant, a plurality of fuel elements arranged in rows and substantially uniformly spaced, each element comprising fissile material in casing, surfaces defining horizontally extending grooves in the external surfaces of said fuel element casings, supports for locating said fuel elements vertically in the coolant and means for locking said fuel elements in the supports, said locking means comprising a horizontally extending locking rod associated with each row of fuel elements and engaging the grooves in said fuel element casings, surfaces defining recesses in said locking rods and means for shifting said rods longitudinally so that the recesses in the locking rods are aligned vertically with the fuel elements to permit withdrawal of the fuel elements from the supports, said locking rods being arranged in pairs extending along alternate lanes between the rows of fuel elements and the rod shifting means for one rod of each pair being located at the opposite end of the pair of rods to the shifting means for the other rod of the pair.

No references cited.